United States Patent
Harris et al.

(10) Patent No.: US 9,256,732 B2
(45) Date of Patent: Feb. 9, 2016

(54) PROCESSING EFFICIENCY ON SECURE SYSTEMS HAVING A HOST PROCESSOR AND SMART CARD

(75) Inventors: Peter William Harris, Cambridge (GB); Peter Brian Wilson, Cambridge (GB); Timothy Charles Thornton, Reading (GB); David Paul Martin, Cambridge (GB)

(73) Assignee: ARM Limited, Cambridge (GB)

( * ) Notice: Subject to any disclaimer, the term of this patent is extended or adjusted under 35 U.S.C. 154(b) by 2585 days.

(21) Appl. No.: 11/979,358

(22) Filed: Nov. 1, 2007

(65) Prior Publication Data

US 2008/0128494 A1     Jun. 5, 2008

(30) Foreign Application Priority Data

Dec. 1, 2006   (GB) .................................. 0624069.1

(51) Int. Cl.
| | |
|---|---|
| *G06F 11/30* | (2006.01) |
| *G06F 12/14* | (2006.01) |
| *G06F 21/53* | (2013.01) |
| *G06F 21/77* | (2013.01) |

(52) U.S. Cl.
CPC .............. *G06F 21/53* (2013.01); *G06F 21/77* (2013.01); *G06F 2221/2149* (2013.01); *G06F 2221/2153* (2013.01)

(58) Field of Classification Search
USPC .......... 713/168–174, 182–186; 709/225, 229; 726/2–8
See application file for complete search history.

(56) References Cited

U.S. PATENT DOCUMENTS

| | | | | |
|---|---|---|---|---|
| 6,094,721 | A | * | 7/2000 | Eldridge .................. G06F 21/31 235/382.5 |
| 2002/0118836 | A1 | | 8/2002 | Howard et al. |
| 2003/0056054 | A1 | | 3/2003 | Levy et al. |
| 2004/0170046 | A1 | * | 9/2004 | Belnet et al. ................... 365/145 |
| 2006/0200864 | A1 | * | 9/2006 | Nakanishi ........ G06K 19/07732 726/27 |

FOREIGN PATENT DOCUMENTS

| | | |
|---|---|---|
| EP | 0 735 718 | 10/1996 |
| EP | 0 864 996 | 9/1998 |
| WO | WO 03/009522 | 1/2003 |
| WO | WO 2004/019190 | 3/2004 |

* cited by examiner

*Primary Examiner* — Evans Desrosiers
(74) *Attorney, Agent, or Firm* — Nixon & Vanderhye P.C.

(57) ABSTRACT

A smart card comprising a data store and a processor, said smart card being operable to connect with a host data processing apparatus, said smart card comprising authentication logic operable when connected to said host data processing apparatus to identify a secure data processing domain having predetermined properties within said host data processing apparatus and in response to identify said secure data processing domain, said smart card is operable to delegate at least some data processing operations to be processed within said secure data processing domain of said host data processing apparatus.

20 Claims, 7 Drawing Sheets

PROCESSING EFFICIENCY ON SECURE SYSTEMS HAVING A HOST PROCESSOR AND SMART CARD

This application claims priority to GB Application No. 0624069.1 filed Dec. 1, 2006, the entire contents of which are incorporated herein by reference.

TECHNICAL FIELD

The technical field is data processing systems, and the technology described below relates to smart cards and their host data processing apparatus.

BACKGROUND

It is known to provide data processing systems with the intent that the data processing operations performed and data values processed by such systems are difficult to determine from examination of the system. A good example of such a secure system is a smart card.

Smart cards are commonly used to control access to subscription services, such as satellite television and mobile phones. Smart cards are designed to be specific to a user, account or device and contain data that should be kept secure. They are designed to be cheap to manufacture and be small and mobile, such that a user can take them with him.

With satellite television such smart cards have secure encryption keys stored within them to allow a properly authorised user to decode received satellite television signals, which cannot be viewed by anyone not having the encryption keys. It is highly desirable that the encryption keys and any other security data stored within the card are maintained confidential to prevent their unauthorised use.

With mobile phones, a smart card specific to a user, will allow access to a phone network and allow the correct user to be billed for that access. Such a smart card will generally be controlled by the network company, while the phone itself could be made by a different company. Clearly it is not desirable that the information specific to the user that is stored on the card should be available to anyone else as this would allow it to be mimicked.

To this end, considerable effort is expended in making it difficult to determine the data processing operations being performed and the data values being manipulated within a smart card whilst it is operating by observing the smart card.

Smart cards were developed to enable secure data to be manipulated only within a small secure environment. Furthermore, they were made to be easily transferable between devices so that purchase of services, or migration of user data, using such cards could be done effectively. They are also small and relatively cheap to produce and the owner of the smart card itself has control over the security of the data, whatever system the card is being used in. For example, if the smart card is a card for a mobile phone then the owner of the card is the network operator, and it is they that wish to control of the security of the data. A disadvantage of these cards is that processing power available on smart cards is limited so that certain functionalities may not be possible. Furthermore, the transfer of data between a smart card and its host processing apparatus is often via a low-speed serial interface and as such the speed of data transfer is very limited.

SUMMARY

A first aspect provides a smart card comprising a data store and a processor, said smart card being operable to connect with a host data processing apparatus, said smart card comprising authentication logic operable when said smart card is connected to said host data processing apparatus to identify a secure data processing domain having predetermined properties within said host data processing apparatus and in response to identifying said secure data processing domain, said smart card is operable to delegate at least some data processing operations to be processed within said secure data processing domain of said host data processing apparatus.

The inventors recognized the disadvantages associated with processing on smart cards. It also recognises that there are an increasing number of data processing apparatus that have secure processing domains. Thus, despite the technical prejudice in a field that has developed smart cards to hold secure data within themselves and never allow it to be processed outside of the smart card, the inventors recognized that given the increased security in some host data processing apparatus, allowing some processing operations to be performed outside of the card may not compromise security unduly, and yet could potentially have the advantage of significantly increasing performance, as well as the ability to implement functionality not previously possible on smart cards, such as secure user interfaces.

It should be noted that the term smart card is used to denote an independent processing unit that is not operable unless it is connected to a host device. It traditionally takes the form of a thin card having a chip on it, however, different formats are also envisaged by this term, for example the smart card could take the physical form of a USB stick or flash key.

Thus, the technology described provides a smart card that has the ability to identify a secure domain within the host apparatus having predetermined properties. If such an acceptable secure processing domain is identified within the host apparatus the smart card will then delegate some of its processing to the secure domain of the host apparatus. In other words the smart card will use some of the data processing capability of the host apparatus to enable it to perform some of its tasks more quickly and possibly to perform additional tasks that it would not otherwise have been able to perform.

It should be noted that the authentication logic can be provided by software that communicates with authentication software on the host or it could be provided by hardware.

In some embodiments, said smart card is operable in response to detecting said secure processing domain to transmit an application to said host data processing apparatus for processing in said secure domain.

The smart card can delegate some of its data processing to the host data processing apparatus in a number of ways, including transmitting applications or executables that can be processed by the host data processing apparatus to the host apparatus.

In some embodiments, said data store stores two versions of an application, one of said versions being suitable for processing by said smart card and one of said versions being suitable for processing by said host data processing apparatus, said smart card being operable in response to detecting said secure processing domain to transmit said version of said application suitable for processing by said host data processing apparatus to said host data processing apparatus for processing in said secure domain.

It may be that an application that is executable by the smart card can be sent in its original form to the host data processing apparatus to be executed. However, it may be that the application needs to be amended in order to be executed within the host data processing apparatus.

In some embodiments, said version of said application suitable for processing by said host data processing apparatus comprises code operable to initiate execution of security critical portions of said application on said smart card.

Execution of applications on a smart card is generally more secure than on a host data processor and as such, it may be desirable to only allow execution of security critical portions of code on the smart card itself. Thus, an application may need to be amended to enable it to be processed on the host data processing apparatus up to a point and then a call is made to the smart card for execution of a particular portion of the code. For example, the smart card may have a monotonic counter for security reasons and it is clear that it would not be a good idea if the host data processing apparatus had a separate counter and thus, the application is amended so that it can be processed by the host data processing application up to a point and can then access the monotonic counter and can then continue processing on the host data processing apparatus. Thus, the application is amended such that a call is sent to the smart card when security critical portions of the code are to be executed and they are executed on the smart card rather than on the host.

In some embodiments, said smart card is operable to transmit scheduling signals to control scheduling of said delegated data processing operations.

It is advantageous if data processing operations, for example, an application can be run on the host data processing apparatus without the need for it having its own operating system. In order to do this, scheduling signals can be sent from the smart card to prompt the processor of the host data processing apparatus to process the application. These often may be in the form of secure interrupts. Secure interrupts are interrupts that can only be serviced by secure software.

In some embodiments, said smart card is operable to detect functionality present within said secure processing domain of said host data processing apparatus and to delegate processing of a function within an application being processed by said smart card if said functionality is available within said secure processing domain.

It may be that rather than sending complete applications, an application that is running on the smart card could benefit from using certain functions that are available within the host data processing apparatus. Thus, in some embodiments the smart card identifies which functionality the host data processing apparatus has and delegates processing of the relevant functions.

In some embodiments, this use of the functionality on the host computer is done via an application programming interface implementation on the smart card.

In some embodiments, said application programming interface implementation is operable to be enabled in response to detection of said secure processing domain having predetermined properties within said host data processing apparatus and operable to be disabled in response to detection of no secure processing domain within said host data processing apparatus.

If the host does not have a suitably secure domain, then the application programming interface would not be enabled and requests to use it would be refused.

In some embodiments, said smart card comprises instructions from an instruction set native to said host data processing apparatus, said smart card being operable in response to detection of said secure processing domain to transmit said instructions to said host data processing apparatus for processing within said secure processing domain.

A smart card may comprise applications that comprise instructions that are native to the host processing apparatus and can thus be processed by the host processing apparatus using its operating system where a secure domain has been detected. In such cases, the entire application can be transferred across and can then be processed more quickly than it could have been processed on the smart card itself. It may also be that such an application cannot be processed by the smart card and is simply held by the smart card as an additional application that can be used in cases where the host data processing apparatus is a suitable host data processing apparatus.

A further aspect provides a data processing apparatus, said data processing apparatus being operable in a plurality of domains comprising a secure domain or a non-secure domain, such that when said data processing apparatus is executing a program in said secure domain said program has access to secure data which is not accessible when said data processing apparatus is operating in said non-secure domain, said data processing apparatus comprising a docking port for receiving a smart card, said docking port comprising input and output ports operable to receive and transmit data from and to said smart card; wherein said data processing apparatus is operable in response to receiving signals indicating data processing operations to be delegated from said smart card to initiate said delegated data processing operations within said secure domain.

As mentioned earlier a smart card is an independent processing unit that is not operable unless connected to a host device. It can have different formats and may not necessarily have a traditional card shape. It may also be permanently attached to the host device.

In some embodiments, said data processing apparatus comprises at least one application or function stored within said secure domain and operable to be processed in response to control signals received from a smart card within said docking port.

The data processing apparatus may comprise applications or functions that will be processed in response to control signals received from the smart card. For example, the function or application may comprise a secure user interface display driver or an optimised cryptographic implementation that the smart card can use to speed up its own processing.

In some embodiments, said data processing apparatus further comprises a monitor mode, said data processing apparatus only being able to switch between said secure and said non-secure domain while operating in said monitor mode. In other applications, said data processing apparatus comprises at least two processor cores, a secure processor core and a non-secure processor core, said data processing apparatus being operable to process data on said secure core when operating in said secure domain and on said non-secure core when operating in said non-secure domain.

The secure domain on a data processing apparatus can be implemented in a number of ways. In some implementations, there are two domains that are switched between using a separate mode called the monitor mode. In other implementations there are actually two separate cores, a secure core and a non-secure core.

A yet further aspect comprises a smart card according to a first aspect connected to a data processing apparatus according to a further aspect.

In example embodiments, the system may comprise a mobile phone. In others it may comprise a set top box for a satellite television system.

A still further aspect provides a method of performing secure data processing using a smart card connected to a host data processing apparatus comprising the following steps: identifying a secure processing domain within said host data processing apparatus from said smart card; delegating data processing operations to said host data processing apparatus from said smart card; and processing said delegated data processing within said secure domain of said host data processing apparatus.

DESCRIPTION OF THE EXAMPLE,
NON-LIMITING EMBODIMENTS

Figure 1:
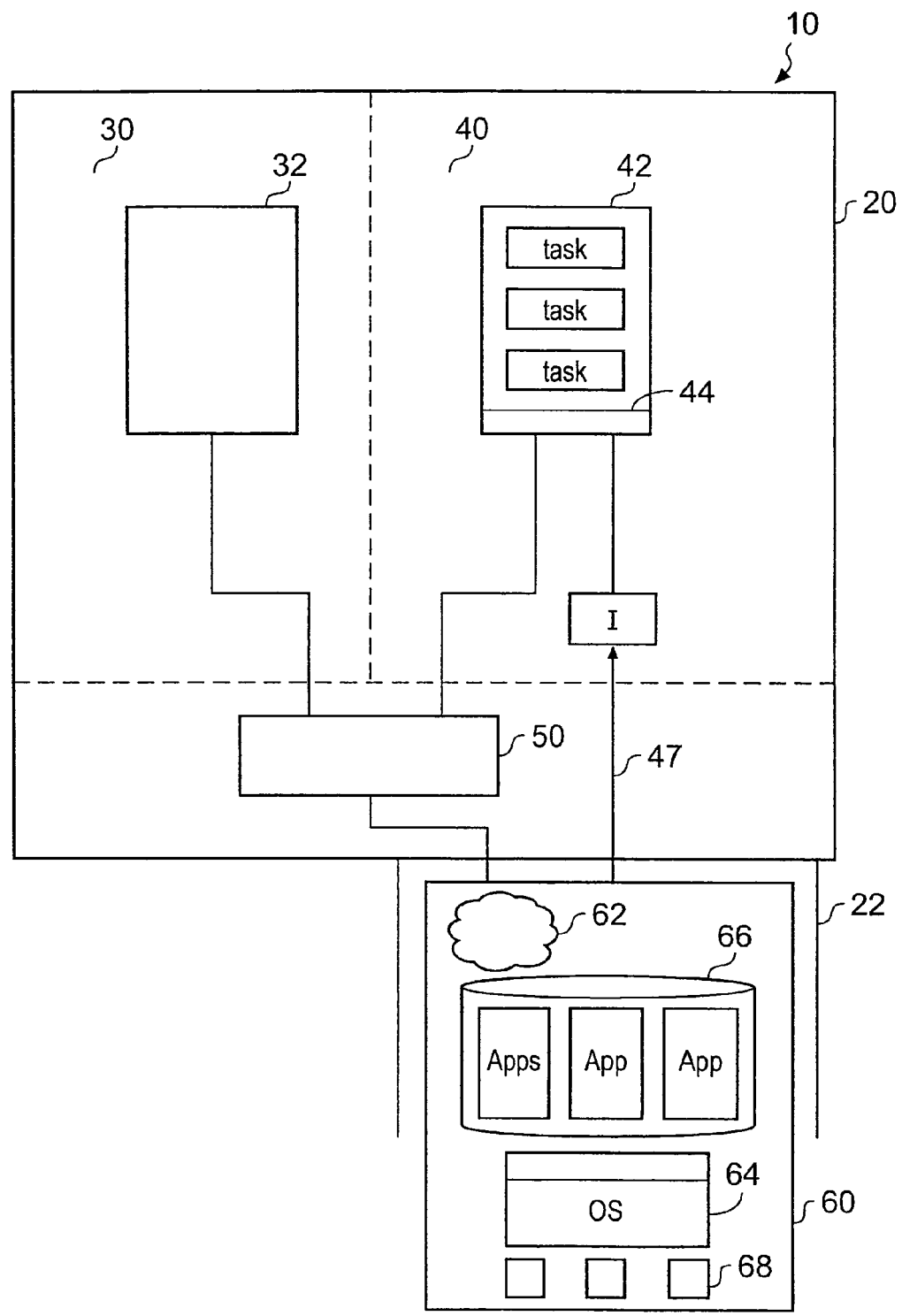
FIG. 1 shows a system according to an example, non-limiting embodiment.

FIG. 1 shows a system according to an example, non-limiting embodiment.

System 10 comprises a host data processing apparatus 20 having a smart card socket 22 operable to receive smart card 60.

Host data processing apparatus 20 has a secure world 40 operable to process data that is not accessible from a non-secure world and a non-secure world 30. Non secure world 30 has a non-secure portion of a data processor 32, whilst secure world 40 has a secure portion of a data processor 42. They are shown as separate data processors in this Figure for simplicity but are in fact a single data processor having secure and non-secure portions. These two worlds are controlled by monitor mode 50 and can only be switched between via this monitor mode 50.

Secure portion of data processing 42 can process a plurality of tasks as is schematically illustrated, and has a communication layer 44 which is operable to send signals to and receive signals from smart card 60. Smart card 60 generally operates as a slave device to the host data processing apparatus and requires the host to push and pull data to and from it. The communication management layer 44 performs that role.

Smart card 60 has its own operating system 64 and a plurality of applications 66. It also has a plurality of functional capabilities 68 and authentication logic 62.

In this embodiment shown, on connection of the smart card to the host apparatus 20, authentication logic 62 determines whether there is a suitable secure world on host data processing apparatus 20. It does this using conventional authentication procedures such as handshaking. When authentication logic 62 has determined that there is a secure world 40 that is suitable, i.e. meets some predetermined criteria, it transfers one of its applications 66 to the secure world for processing. This application is then processed as one of the tasks by secure data processing core 42. Scheduling of this processing is determined by the smart card 60 which sends scheduling control signals in the form of interrupts along data line 47.

These prompt secure processor core 42 to process the application that has been transferred.

Thus, some of the data processing that the smart card generally needs to perform has been transferred to the host data processing apparatus whose data processing capabilities are naturally higher.

In the embodiments described a whole application is transferred. It may be an application that would otherwise be processed by the smart card 60, or it may be an amended version of an application for processing on the smart card 60. Some smart cards store on data store 66, two versions of an application one for execution on the smart card and one for execution on the host.

In some embodiments the smart card still retains control of execution (scheduling etc.) of the delegated or transferred applet and may also provide the host with access to some of its own functionality for secure critical sections of code, for example cryptography processes that use root smart card keys which it is not desirable to send outside of the smart card or processing steps requiring the monotonic counter present on the smart card which for security reasons it is undesirable to duplicate. In such situations the application or applet (an application that runs in an execution environment) that has been transferred to the host is the amended version that has been amended to schedule calls to the smart card. Thus, when it reaches a security critical part it calls the smart card, receives a response to these calls, and then when the security critical portion has been executed by the smart card a return to the secure software on the host that made the original request to the smart card can be made. The delegated applet should then be able to take advantage of hardware acceleration features on the host system, while still retaining the secure advantages of the smart card for security critical portions of the code.

The applet delegated for processing on the host should be able to take advantage of hardware acceleration features present on the host such as cryptographic processors. To do this a hardware abstraction layer on the host data processing apparatus is used. The use of such a standardised application programming interface makes the physical location of execution transparent to both the calling application that is requesting services from the smart card and to the applet executing on the host/smart card combination.

Thus, programmers designing the applications should be aware of the possibility that the execution environment may not be solely on the smart card, and thus, it may in some circumstances be applicable to provide two versions of an application, one version being suitable for processing on the smart card and the other version being suitable for at least partial processing on the host data processing apparatus. Allowing access to some of the features such as monotonic counters on the smart card while processing the majority of an application on the host helps impede possible attacks that may arise if these resources are not adequately protected, while still taking advantage of the improved processing power of the host.

Processing the application on the high performance applications processor of the host means that the software will be executed faster than would be possible on the smart card alone. The smart card's applications processor is also able to take advantage of high performance cryptographic accelerators or other peripherals on the host which are not generally present on smart cards. Furthermore, the data processing apparatus may able to interact with platform specific peripherals, such as a secure display and/or a secure user interface. This allows more complex application programs to be designed and executed. Thus, the versions that are written for execution on the host data processing apparatus may not only contain calls to the smart card to use some of its secure resources, but they may further contain features such as secure user interface displays that would not be possible and are not provided by applications that are processed by the smart card alone.

Figure 2:
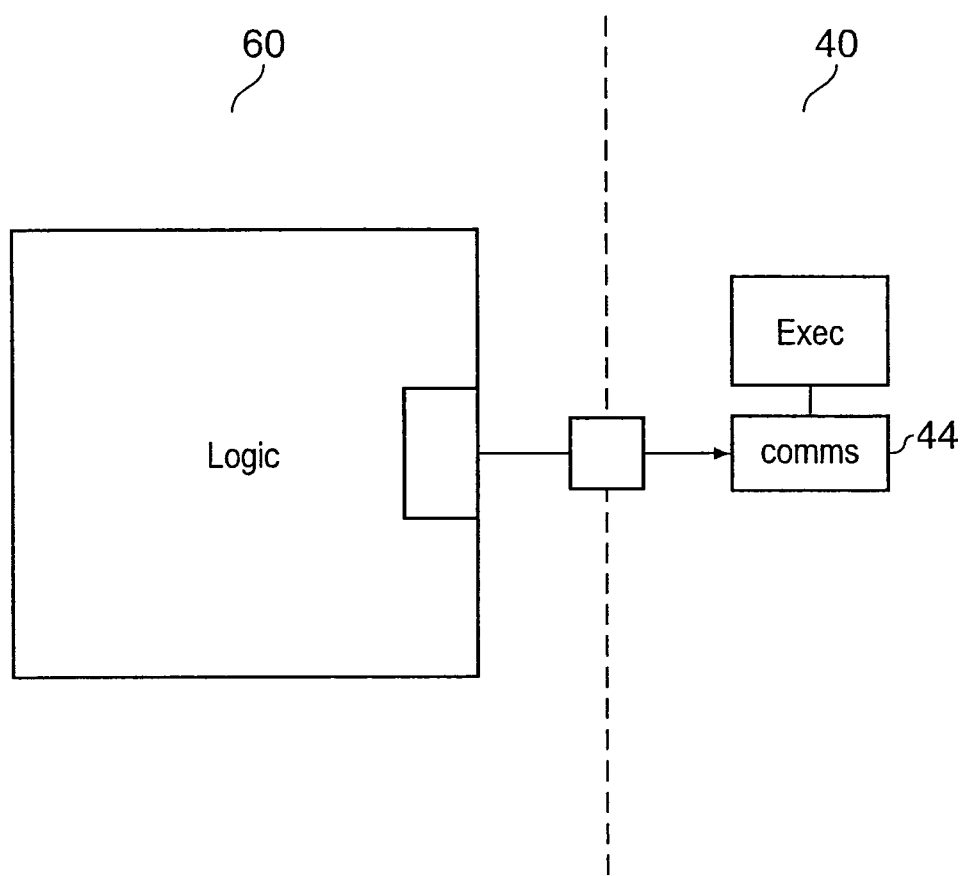
FIG. 2 shows very schematically a smart card connected to a secure portion of a data processing apparatus.

FIG. 2 schematically shows an example, non-limiting embodiment. Smart card side is on the left 60 and comprises logic which has a number of applications or executables. One of these or possibly more is transferred for execution in the secure world 40 of the data processing apparatus 20. It is transferred via the communications management section 44 and is then executed within processor core 42. Communications manager section 44 is a small amount of trusted manager software or hardware present in the secure section of the host data processing apparatus 20, which acts to "pull" data and/or applications and executables out of the smart card and to send data back to it as required. These applications are executable on the host data processing system independent of its operating system, the execution of the code being controlled by signals (interrupts) sent from the smart card. Thus, applications can be transferred for execution on the host without the need for compatibility with its operating system.

Although in this embodiment there is a communications manager for facilitating the mechanics of delegation or data transfer out of and back to the smart card within the host, in other embodiments the smart card may have some form of communication control resident on it. In such a case the host will not have a communication manager and the card will operate more autonomously.

Figure 3:
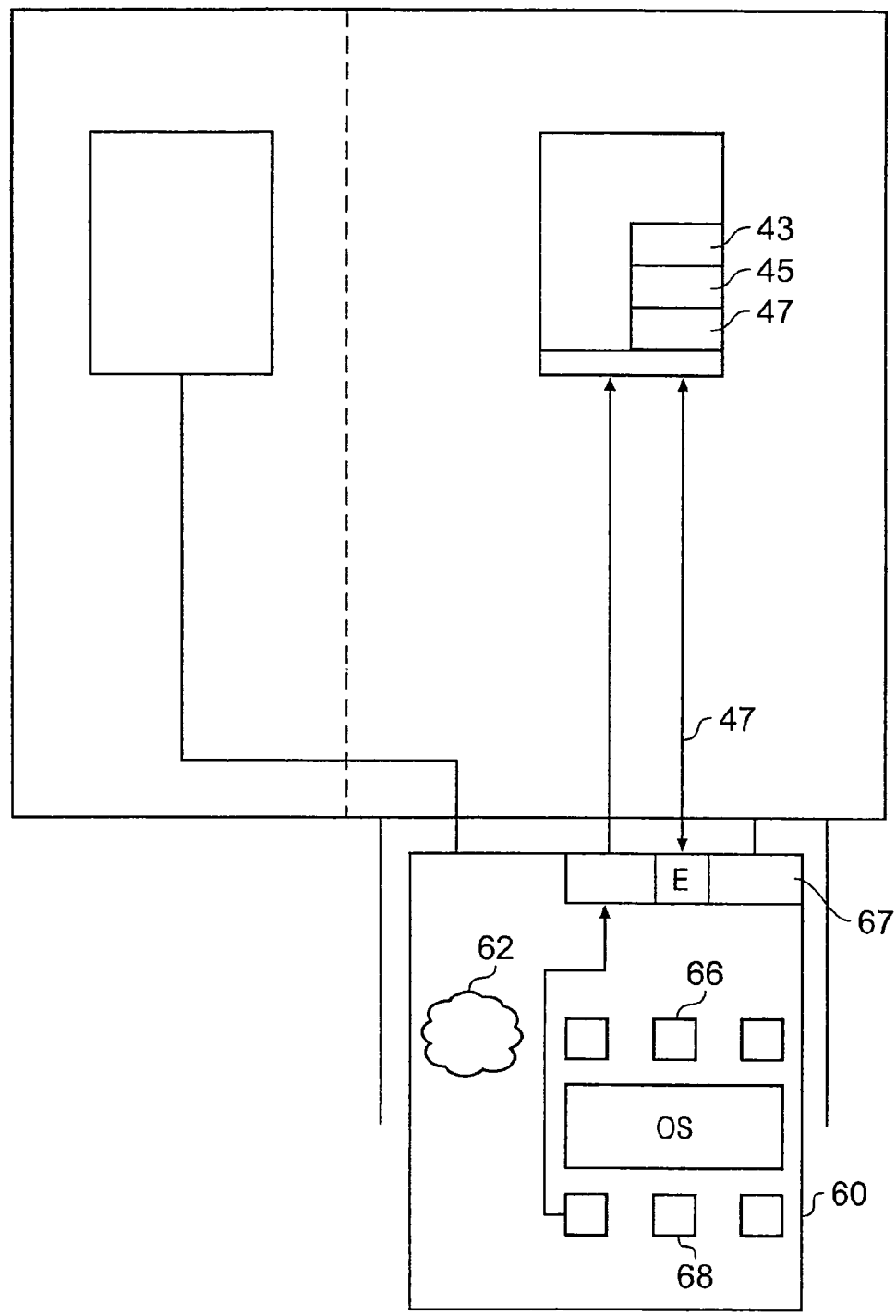
FIG. 3 shows an alternative example embodiment of a system.

FIG. 3 shows an alternative embodiment of a system 10. In this embodiment, smart card 60 has an application programming interface implementation 67 and applications running on the smart card run on this layer. In such cases the applet will still execute on the smart card, but will make requests to use platform functionality (such as a cryptography implementation or a trusted user interface) via the API, which can operate to delegate functions within an application that is being processed by the processor within smart card 60. This layer is enabled in response to authentication logic 62 identifying that a secure world is available. This layer then looks to see what resources are available in the secure world. It identifies functional components 43, 45, 47 which are things such as secure user interface display drivers and optimised cryptographic implementations and if an application running on the smart card requires such a functionality then it delegates the processing to the secure world processor 42 and in particular to the appropriate functional element.

Figure 4:
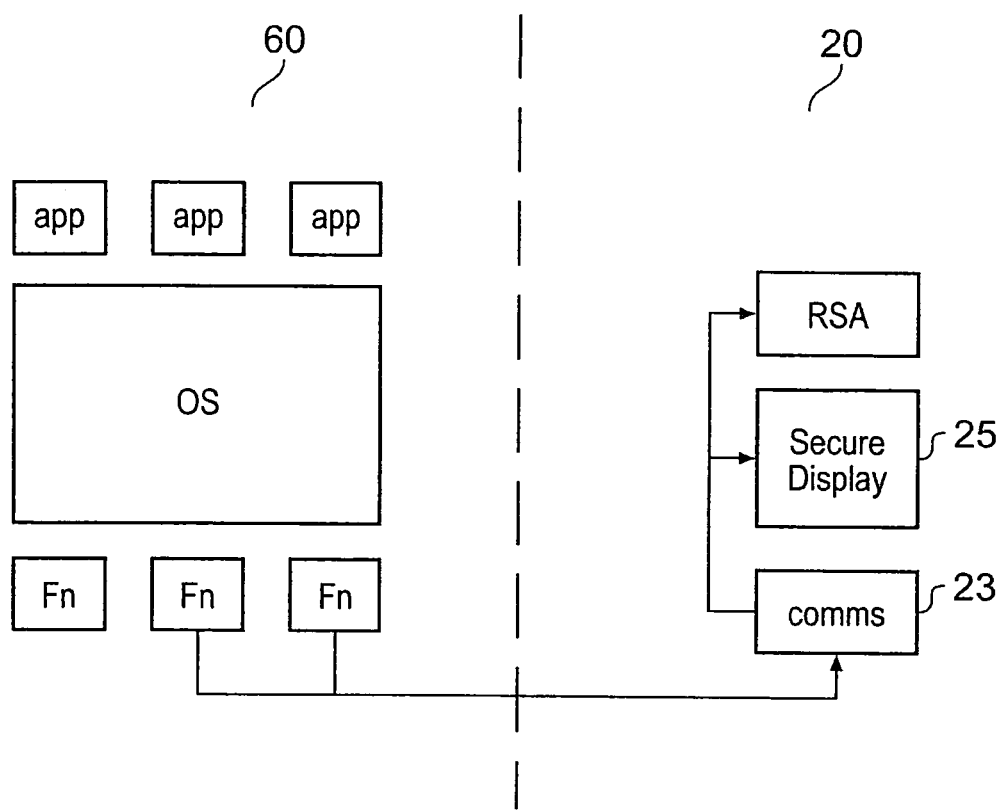
FIG. 4 schematically shows the transfer of functions from a smart card to a host data processing apparatus.

FIG. 4 shows schematically this process being implemented. In this case the functionality aspects of the applications on the smart card side 60 are transferred via the smart card communications manager 23 on the host 20 and these secure functions, such as secure display 25 are performed by the host.

The choice of whether to delegate functionality to the host's secure world could be made by the application. That is to say as smart cards are physically more secure the application may explicitly decide to ensure cryptography for example is not delegated outside of the smart card to ensure security constraints are met. Delegation could be completely transparent, with the smart card abstraction layer making the decision to delegate or not. The application would request a service from the smart card using the application processing interface and the abstraction software could negotiate with the host and offload the job if possible.

Figure 5:
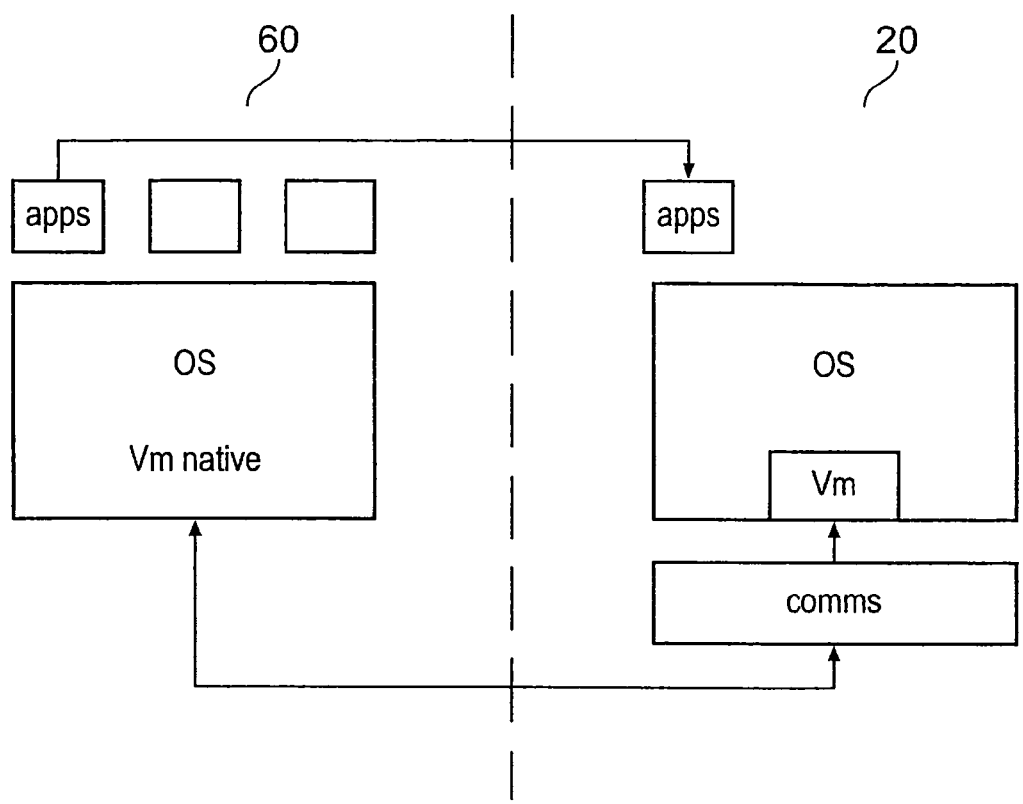
FIG. 5 schematically shows the transfer of native code and applications from a smart card to a host data processing apparatus.

FIG. 5 shows functionally a further embodiment in which the smart card has code native to a particular secure host data processing apparatus embedded on the smart card. This code that is designed to run in a suitably secure environment on the host processor is transferred to the host processor once the smart card is connected and authentication has been performed. This code is actually run on the operating system perhaps on a virtual machine on the data processing host itself. It may be that the applications specified by the code can also run on the smart card or it may be that applications are held on the smart card that can only be run on a host processor and if a host is not a suitable host processor then these applications are not available. Merely transferring whole applications like this can increase the speed and the amount of processing that can be performed. An application using this technique would implement accelerated versions of some of the functions implemented in the smart card software, if the smart card is attached to a suitable host. It could be used to accelerate smart card functionality for which no standard implementation or application processor interface is defined on the host.

In the embodiments shown, there are a variety of tasks, functions and applications that can be delegated by the smart card to the host processor. Clearly, a combination of these could also be performed.

Figure 6:
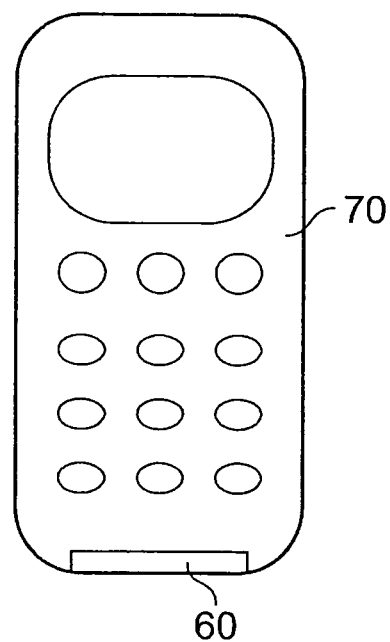
FIG. 6 shows one embodiment of the present invention comprising a mobile phone having a smart card.

FIG. 6 shows a mobile phone 70 having a smart card 60 according to an example, non-limiting embodiment.

Figure 7:
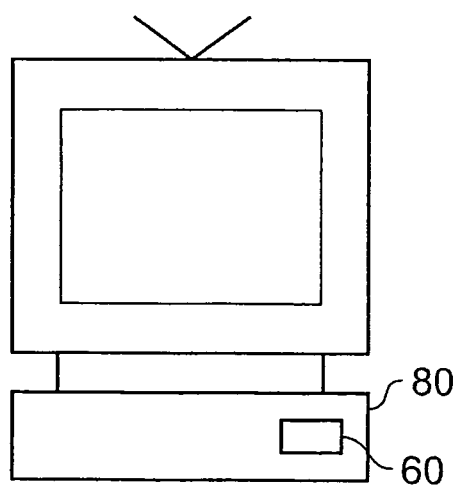
FIG. 7 schematically shows a set top box with a smart card according to an example, non-limiting embodiment.

FIG. 7 shows schematically a set top box 80 with a smart card 60 according to an example, non-limiting embodiment. Clearly other implementations of smart cards are envisaged.

Figure 8:
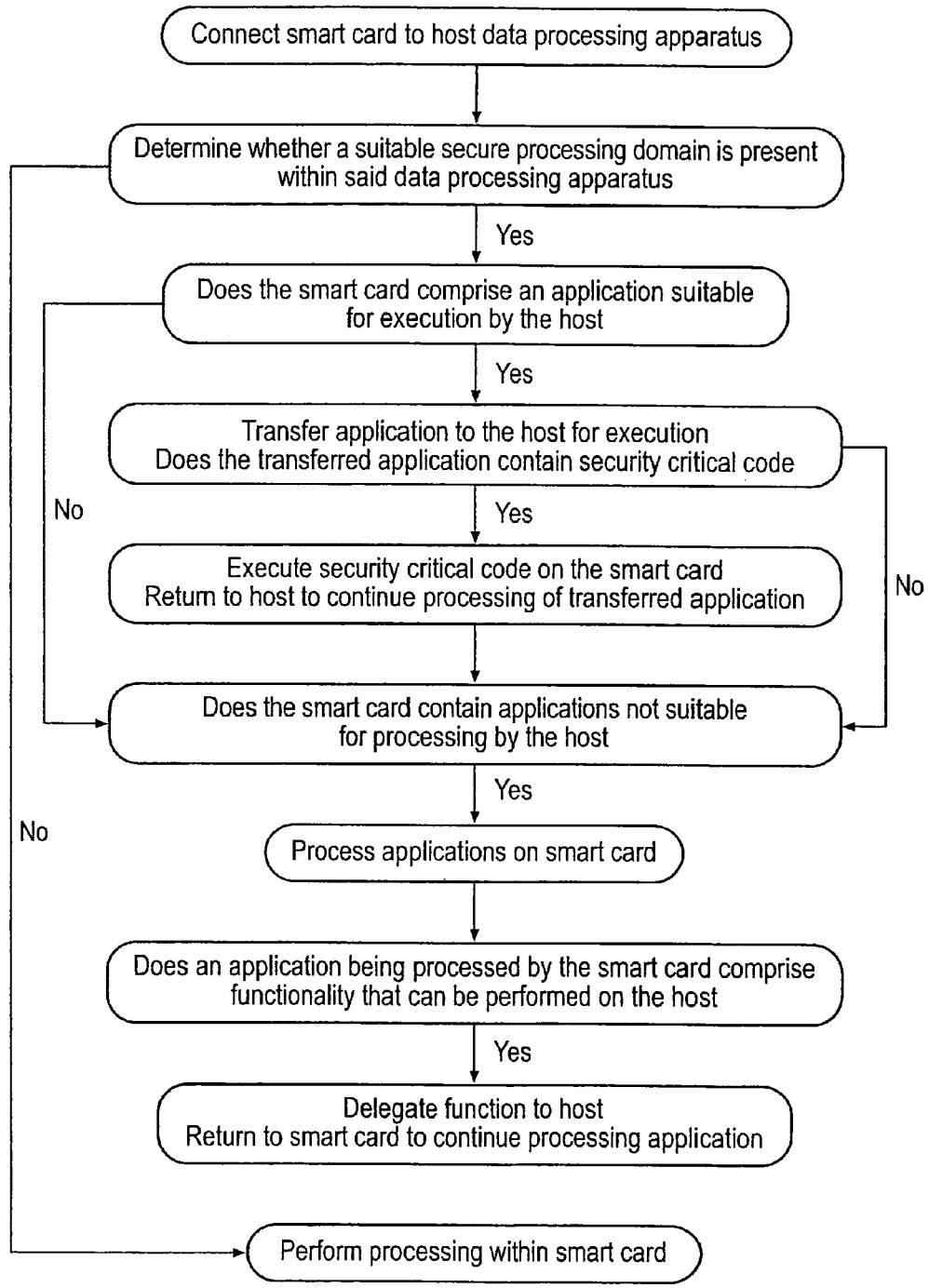
FIG. 8 shows a flow diagram illustrating steps in a method of an example, non-limiting embodiment.

FIG. 8 shows a flow diagram illustrating steps in a method of an example, non-limiting embodiment.

Initially a smart card is connected to a host data apparatus and then the smart card determines using its authentication logic whether a suitable processing domain is present within the host data processing apparatus. If it is not then all of the processing is performed within the smart card. However, if the smart card does detect a suitable host data processing apparatus then it looks to see if it has any applications that are suitable for execution by this host.

If there is such an application it transfers this application to the host for execution. If the transferred application contains security critical code then this is executed on the smart card itself with processing of the transferred application being returned to the host following execution of this security critical code. It may be that the security critical code is some cryptographic processor using the root smart card keys which it is important are not transferred from the smart card or it may be that the application needs to use the monotonic counter which is present on the smart card itself.

The smart card also looks to see if it has any applications not suitable for processing by the host and if it does it processes these on the smart card itself. It may be that some of these applications that are processed on the smart card comprise functionality that can be performed on the host. Thus, although it is not suitable to transfer the whole application, some of the functionality can be delegated to the host. If this is the case these functions are delegated to the host and then processing is returned to the smart card following processing of the particular function.

Although illustrative embodiments have been described in detail herein with reference to the accompanying drawings, it is to be understood that the claims are not limited to those embodiments, and that various changes and modifications can be effected therein by one skilled in the art without departing from the scope of the appended claims.

We claim:

1. A smart card comprising a data store and a processor, said smart card being configured to connect with a host data processing apparatus, said smart card comprising authentication logic configured, when connected to said host data processing apparatus, to identify a secure data processing domain having predetermined properties within said host data processing apparatus; and said smart card is configured to delegate at least some data processing operations to be processed within said secure data processing domain of said host data processing apparatus in response to identifying said secure data processing domain.

2. A smart card according to claim 1, wherein said smart card is operable in response to detecting said secure processing domain to transmit an application to said host data processing apparatus for processing in said secure domain.

3. A smart card according to claim 2, said data store storing two versions of an application, one of said versions being suitable for processing by said smart card and one of said versions being suitable for processing by said host data processing apparatus, said smart card being operable in response to detecting said secure processing domain to transmit said version of said application suitable for processing by said host data processing apparatus to said host data processing apparatus for processing in said secure domain.

4. A smart card according to claim 3, wherein said version of said application suitable for processing by said host data processing apparatus comprises code operable to initiate execution of security critical portions of said application on said smart card.

5. A smart card according to claim 1, said smart card being operable to transmit scheduling signals to control scheduling of said delegated data processing operations.

6. A smart card according to claim 1, said smart card being operable to detect functionality present within said secure processing domain of said host data processing apparatus and to delegate processing of a function within an application being processed by said smart card if said functionality is available within said secure processing domain.

7. A smart card according to claim 6, wherein said smart card further comprises an application programming interface implementation, said application programming interface implementation being operable to perform said delegation of function processing to said secure processing domain.

8. A smart card according to claim 7, said application programming interface implementation being operable to be enabled in response to detection of said secure processing domain having predetermined properties within said host data processing apparatus and operable to be disabled in response to detection of no secure processing domain within said host data processing apparatus.

9. A smart card according to claim 1, said smart card comprising instructions from an instruction set native to said host data processing apparatus, said smart card being operable in response to detection of said secure processing domain to transmit said instructions to said host data processing apparatus for processing within said secure processing domain.

10. A data processing apparatus, said data processing apparatus having a plurality of domains comprising a secure domain and a non-secure domain, such that when said data processing apparatus is executing a program in said secure domain said program has access to secure data which is not accessible when said data processing apparatus is operating in said non-secure domain, said data processing apparatus comprising a docking port for receiving a smart card, said docking port comprising input and output ports configured to receive and transmit data from and to said smart card; wherein said data processing apparatus is configured in response to receiving signals indicating data processing operations to be delegated from said smart card to initiate said delegated data processing operations within said secure domain.

11. A data processing apparatus according to claim 10, said data processing apparatus comprising at least one application or function stored within said secure domain and operable to be processed in response to control signals received from a smart card within said docking port.

12. A data processing apparatus according to claim 11, wherein said at least one function or application comprises at least one of the following, a secure user interface display driver and an optimised cryptographic implementation.

13. A data processing apparatus according to claim 10, wherein said data processing apparatus is operable to receive delegated operations from a smart card within said docking port and to process said delegated operations within said secure domain in response to scheduling signals received from said smart card.

14. A data processing apparatus according to claim 10, wherein said data processing apparatus is operable to receive instructions from an instruction set native to said data processing apparatus and is operable to process said instructions within said secure domain.

15. A data processing apparatus according to claim 10, wherein said data processing apparatus further comprises a monitor mode, said data processing apparatus only being able to switch between said secure and said non-secure domain while operating in said monitor mode.

16. A data processing apparatus according to claim 10, wherein said data processing apparatus comprises at least two processor cores a secure processor core and a non-secure processor core, said data processing apparatus being operable to process data on said secure core when operating in said secure domain and on said non-secure core when operating in said non-secure domain.

17. A system comprising a smart card according to claim 1, connected to a data processing apparatus according to claim 10.

18. A system according to claim 17, said system comprising a mobile phone.

19. A system according to claim 17, said system comprising a set top box.

20. A method of performing secure data processing using a smart card connected to a host data processing apparatus comprising the following steps:

identifying a secure processing domain within said host data processing apparatus from said smart card;

delegating data processing operations to said host data processing apparatus from said smart card; and processing said delegated data processing within said secure domain of said host data processing apparatus.

* * * * *